United States Patent [19]

Ziegler

[11] Patent Number: 4,673,347

[45] Date of Patent: * Jun. 16, 1987

[54] MULTIPLE STATION, MULTIPLE CLAMP ASSEMBLY BLOW MOLDING MACHINES

[76] Inventor: William E. Ziegler, 2570 Coachlite Dr., Tecumseh, Mich. 49286

[*] Notice: The portion of the term of this patent subsequent to May 20, 2003 has been disclaimed.

[21] Appl. No.: 642,998

[22] Filed: Aug. 21, 1984

[51] Int. Cl.⁴ .............................................. B29C 49/38
[52] U.S. Cl. .................. 425/538; 425/451.4; 425/451.6
[58] Field of Search .................. 425/538–541, 425/451, 451.4, 451.6

[56] References Cited

U.S. PATENT DOCUMENTS

| | | | |
|---|---|---|---|
| 2,290,129 | 7/1942 | Moreland et al. | 425/539 |
| 3,496,599 | 2/1970 | Brown | 425/540 |
| 3,501,809 | 3/1970 | Kinsey | 425/540 |
| 3,611,484 | 6/1969 | Lecluyse | 425/541 |
| 3,764,250 | 10/1973 | Waterloo | 425/540 |
| 3,778,213 | 12/1973 | Di Settembrini | 425/541 |
| 3,854,855 | 12/1974 | Pollack et al. | 425/538 |
| 3,869,237 | 3/1975 | Hellmer et al. | 425/541 |
| 3,872,203 | 3/1975 | Yoshikawa et al. | 425/540 |
| 4,589,838 | 5/1986 | Ziegler | 425/541 |

Primary Examiner—Willard E. Hoag
Attorney, Agent, or Firm—James M. Deimen

[57] ABSTRACT

A multiple station, multiple clamp assembly rotary blow molding machine for the manufacture of plastic bottles and the like incorporating novel toggle actuation means for the clamp assemblies, novel actuation means for the pre-finish mechanism and novel actuation means for parison stretching. The novel toggle actuation means for the clamp assemblies eliminate the need for separate linear or rotary hydraulically driven clamp actuators for each clamp assembly. Rather, a single rotary actuator is required for the mold closing station and a second single rotary actuator is required for the mold opening station. The toggle linkage includes adjustment means for fine adjusting the length of each toggle linkage. The clamp assemblies include spring means for assuring complete overcentering action of the toggle linkages to thereby provide a positive latching or locking of the clamp assemblies and molds in the closed position.

15 Claims, 20 Drawing Figures

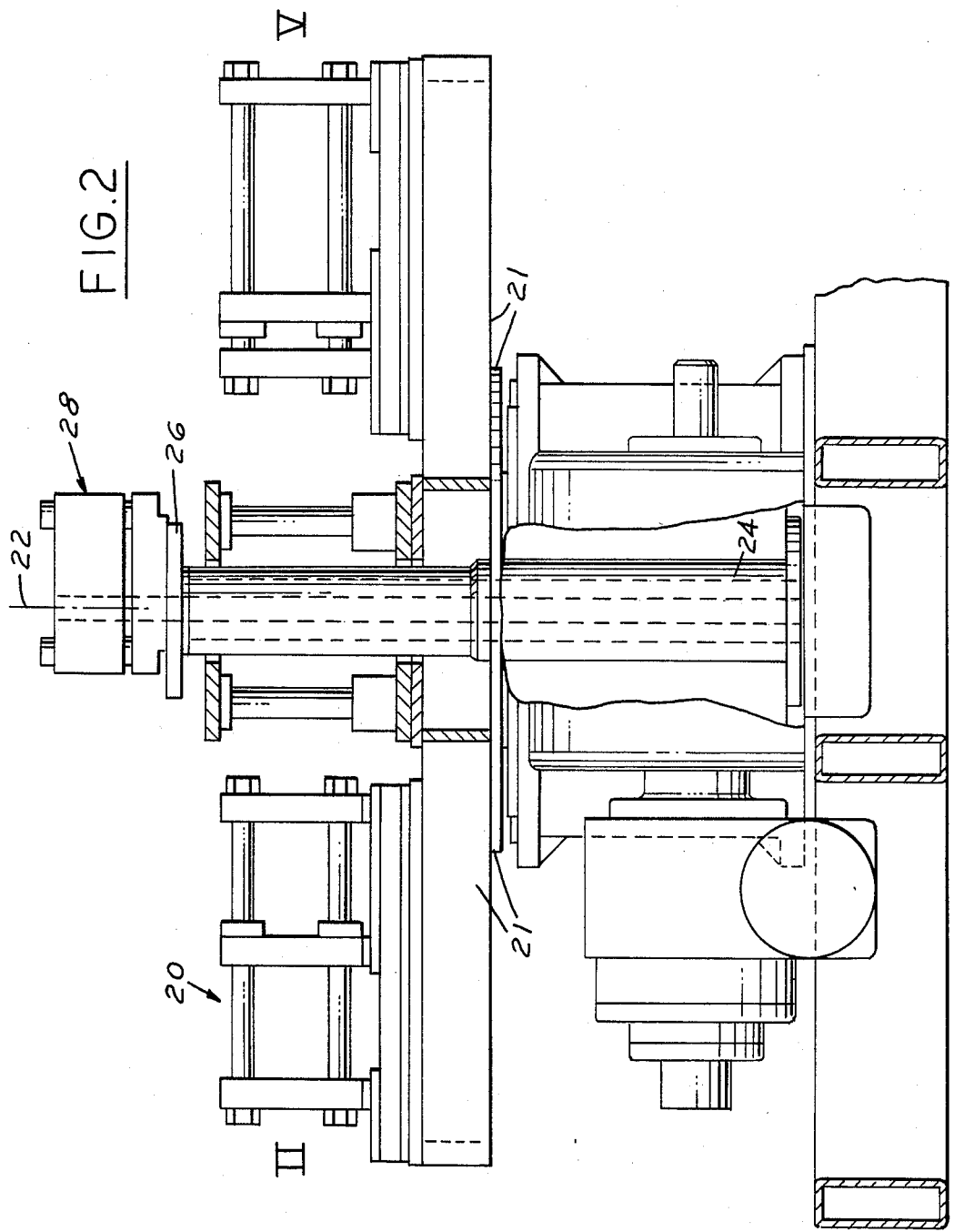

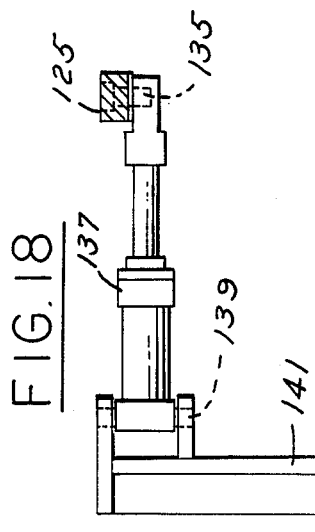
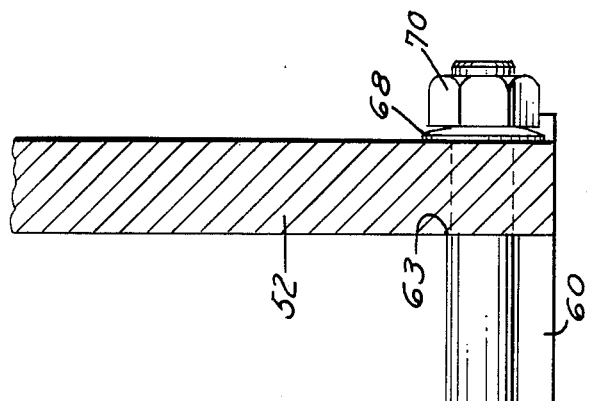
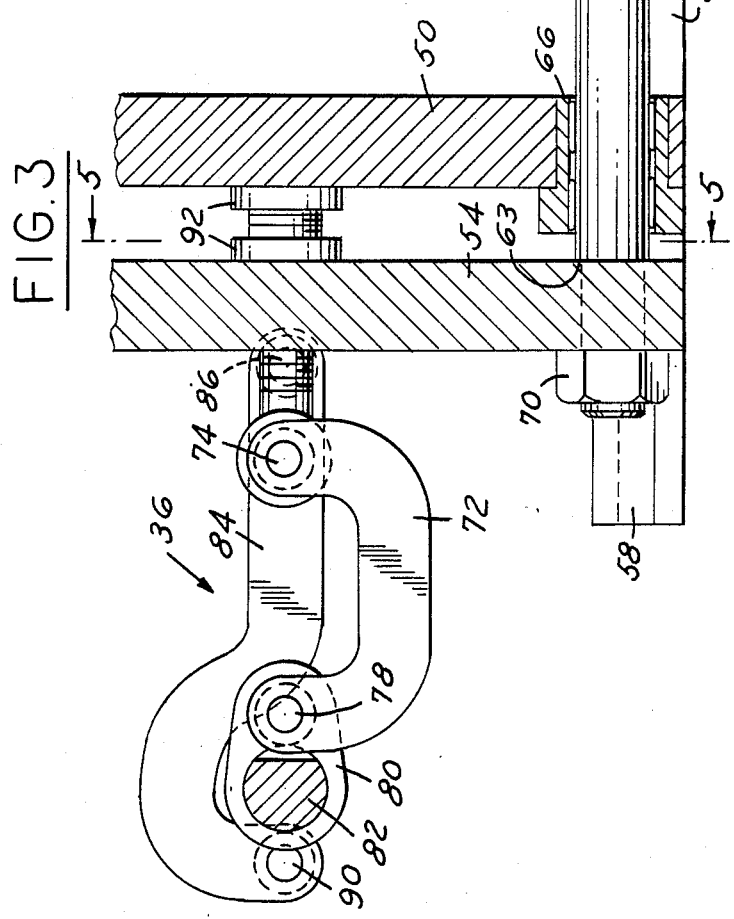
FIG.18
FIG.3

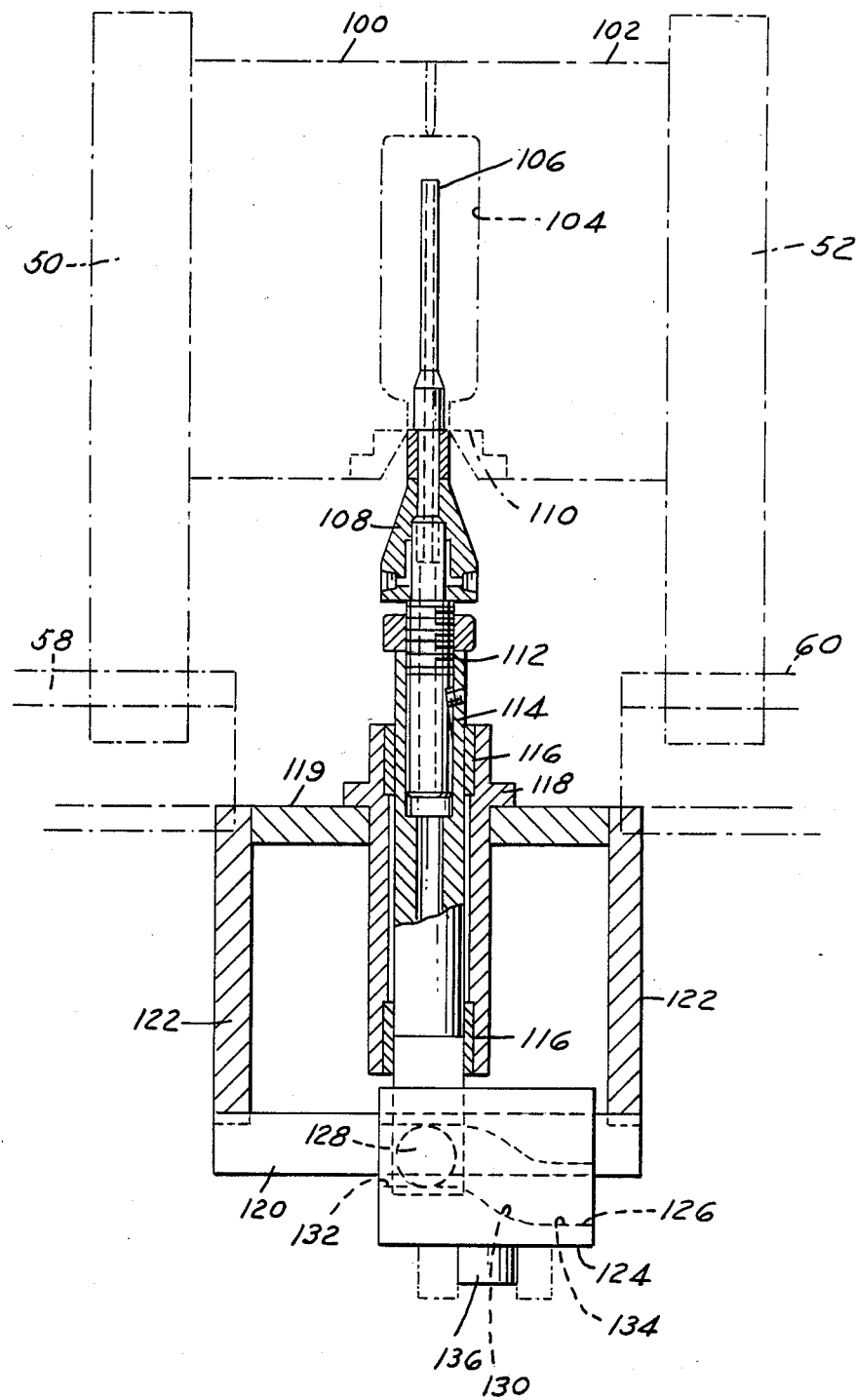

MULTIPLE STATION, MULTIPLE CLAMP ASSEMBLY BLOW MOLDING MACHINES

BACKGROUND OF THE INVENTION

The invention pertains to multiple station, multiple clamp assembly blow molding machines for the manufacture of bottles and the like. In particular, the invention pertains to various improvements in mechanisms for clamping the molds together, stretching the extruded parison and pre-finishing the bottle at the opening thereof.

Multiple station blow molding machines are usually of circular or rotary configuration wherein the machine comprises a plurality of stations located about a circular path. Usually the machine includes a plurality of clamp assemblies, each containing a mold for one or more bottles. The total number of clamp assemblies usually equals the total number of stations. The clamp assemblies rotate from station to station about the circular path with various operations taking place either at the various stations which are of fixed location, or during movement between stations.

In a typical machine each clamp assembly requires a mechanism for closing and opening the clamp assembly to thereby close and open the mold therein and means to assure that the mold remains tightly clamped together during the blowing and prefinishing stages of making the bottle. Modern machines typically use a cam or hydraulic pressure mechanism for opening and closing the clamp assembly with cam action or hydraulic pressure providing for tight closure at the end of the closing stroke. A hydraulic or other actuator is attached to each clamp assembly and moves with the clamp assembly about the circular path of the machine. Such a machine therefore requires a separate actuator for each clamp assembly and means to supply hydraulic power to the actuator as it moves about the circular path.

The toggle action clamp assembly locks the molds tightly together at the end of the toggle linkage stroke. The hydraulic actuator is continuously pressurized to assure that the molds remain tightly joined until blowing and pre-finishing are completed and the bottle is ready to be ejected from the mold.

Pre-finish devices for blow molding machines-typically are combined with the blow pin assembly, either of which or both, may be moveable vertically. The vertical movement is actuated by a cam or a crank mechanism at the appropriate moment during the blow molding cycle. The cam mechanism is extensive in length and complicated to manufacture because the entire clamp assembly supporting the blow pin and pre-finish unit moves relative to the cam, the cam being fixed to the base of the machine.

Stretching means for stretching the lower end of a parison into an oblong shape also require a complicated mechanism. The stretching means are actuated with a mechanism separate from the support that carries the stretching means on a moveable clamp assembly. The stretching means usually comprises a single upwardly extending pin spaced from a blow pin pre-finish unit. The single pin and blow pin of the stretching means are actuated to move in opposite directions at appropriate moments in the machine cycle and therefore are typically cam operated. Thus, a complicated actuation mechanism is required for stretching means that are mounted on a machine which moves the bottle blowing apparatus, clamp assembly and molds from station to station about the machine. Applicant's invention disclosed below is directed to improved and more effective mechanisms incorporated in a multi station, multi clamp assembly blow molding machine.

SUMMARY OF THE INVENTION

The invention comprises an improved multiple station, multiple clamp assembly blow molding machine for the manufacture of plastic bottles and other similar articles. More specifically, the invention is directed to various features which provide a more effective, less expensive blow molding machine.

Each of the clamp assemblies is provided with a toggle linkage assembly that is actuated by a crankshaft. The crankshaft in turn includes means that are engageable with a hydraulic rotary actuator. Hydraulic actuators, however, are provided only at those stations, normally two, that require the clamp assembly to be opened or closed. At other stations between closing and opening and during indexing between the stations, the toggle linkage is effectively locked and the crankshaft prevented from rotating thereby preventing release of the clamp assembly. Within the clamp assembly and toggle linkage assembly, means are provided for fine adjusting the length of the toggle linkages individually. Resilient springs means are incorporated for overcentering of the toggle linkages to provide positive latching or locking when the clamp assembly is closed. The positive latching or locking feature eliminates the need for a hydraulic actuator on each clamp assembly and moveable therewith.

Adjacent and attached to each clamp assembly and extending upwardly in between the clamping platens is a combined blow pin pre-finish unit. The blow pin pre-finish unit is moveable upwardly and downwardly to pre-finish the open end of the bottle as it is blown. The motion of the pre-finish unit and blow pin is actuated by a relatively short horizontally moveable cam. The cam engages a follower which in turn is directly attached to the blow pin pre-finish unit. The cam rides on a horizontal track suspended beneath the blow pin pre-finish unit. The track, being attached to the blow pin pre-finish assembly and a part thereof, moves with the clamp assembly from station to station about the machine. A second follower extends downwardly from the cam and is adapted to engage second cams fixed to the machine base at appropriate locations adjacent stations so as to move the first cam horizontally on the track as the clamp assembly passes by. The cam is shaped with a central ascending-descending portion leading to horizontal dwell portions on either side thereof. The follower attached to the blow pin pre-finish unit and driven by the first cam, remains in one of the dwell portions of the first cam unless the first cam is moved by the second cam. Thus, the cams utilized for actuating the pre-finish unit are very short and simple in configuration.

The stretching means incorporates the pre-finish blow pin assembly as one of the two upwardly extending stretch pins. The entire stretching means moves with the clamp assembly from station to station. The blow pin pre-finish assembly and the separate stretch pin are both supported on a pair of parallel horizontally moveable rods. Each of the rods include a rack formed thereon and engageable with a single pinion gear therebetween. Rotation of the pinion gear causes the rods to move in opposite directions. The blow pin pre-finish assembly is attached to one rod and slidably supported on the other rod whereas the separate upwardly extending stretch pin is attached to the other rod and slidably supported on the first rod. Thus, as the parallel rods move, the stretch means move in opposite directions. The pinion gear is mounted on a vertical shaft having a crank and a follower on the crank. The follower is engageable by a cam attached to a movable platen adjacent the mold. Mold closure engages the cam with the follower thereby rotating the crank and pinion gear to extend the stretching means. Fixedly mounted on the machine base is a fixed cam engaged when the clamp assembly and stretch means move past the cam. The fixed cam causes the stretching means to retract. The stretching means cam, however, is mounted on the platen in a manner that allows the horizontal position of the cam to be selectably adjusted. The horizontal position of the cam controls the rotational angle through which the crank turns and the pinion gear turns, thereby determining the stroke of the stretch means.

DESCRIPTION OF THE DRAWINGS

FIG. 2 is a schematic partially cutaway side view of the machine showing two stations;

FIG. 3 is a partial cutaway plan view of a single clamp assembly toggle linkage combination;

FIG. 9 is a partial cutaway side view of a dual pre-finish and blow pin assembly unit;

FIG. 18 is a side view of a base mounted cam unit taken along the line 18—18 of FIG. 17.

DESCRIPTION OF THE PREFERRED EMBODIMENT

Figure 1:
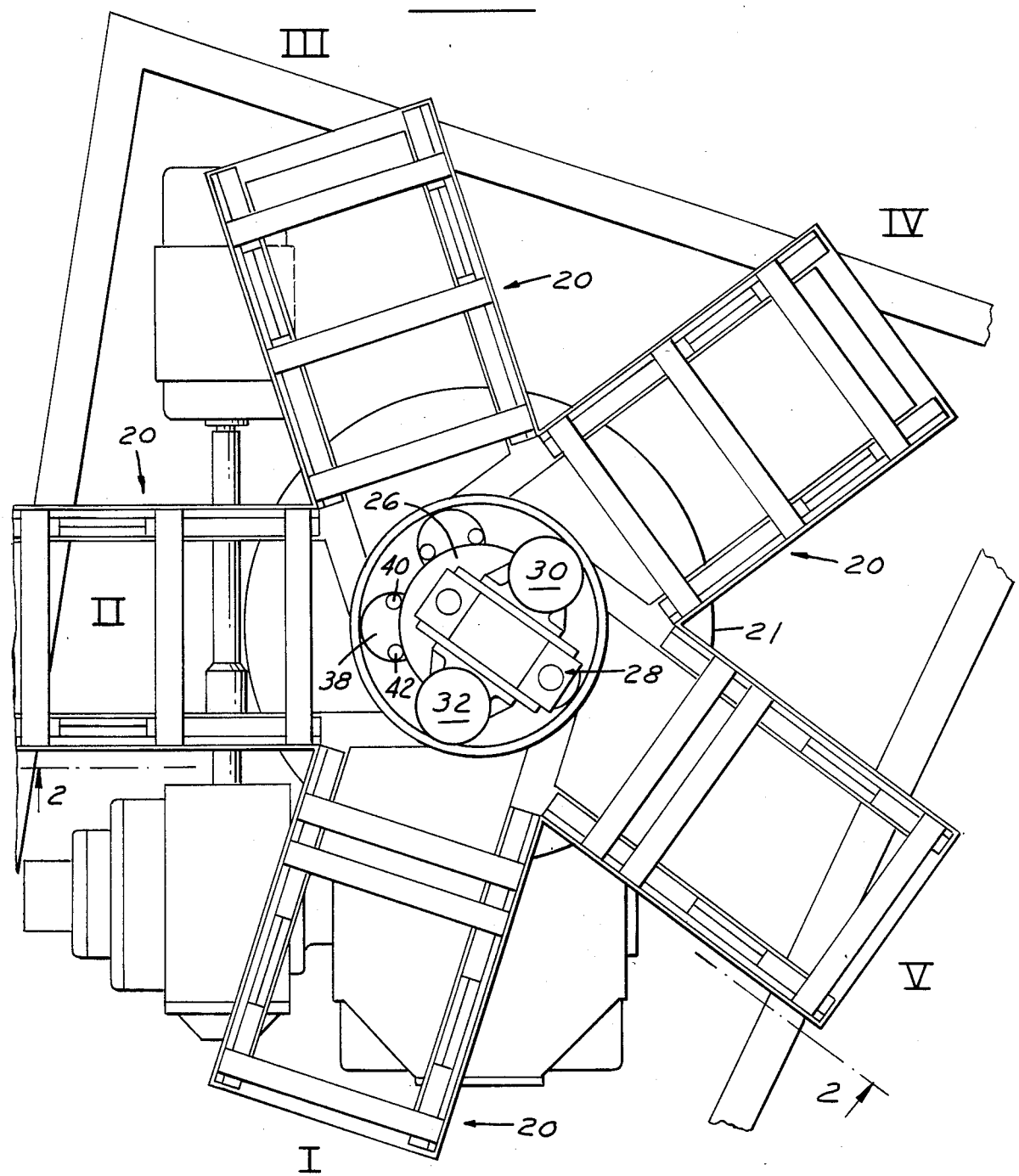
FIG. 1 is a schematic plan view of a five station rotary machine showing the clamp assemblies.

FIGS. 1 and 2 illustrate a five station, five clamp assembly machine. The five stations are identified by the Roman numerals I through V. The five stations, I through V, are fixed locations on the machine. As shown in FIG. 1 five clamp assemblies generally denoted by 20 are shown at the five stations. The machine is a rotary machine wherein the clamp assemblies affixed to a table 21 rotate among the five stations in sequence about the center pivot 22. The rotation is intermittent wherein the clamp assemblies dwell at the stations and then simultaneously index therebetween. As shown, the clamp assemblies 20 are open at stations I and V and closed at stations II through IV. In actual operation station I is the clamp assembly close station wherein the molds contained within the clamp assembly are closed about an extruding parison.

Figure 16:
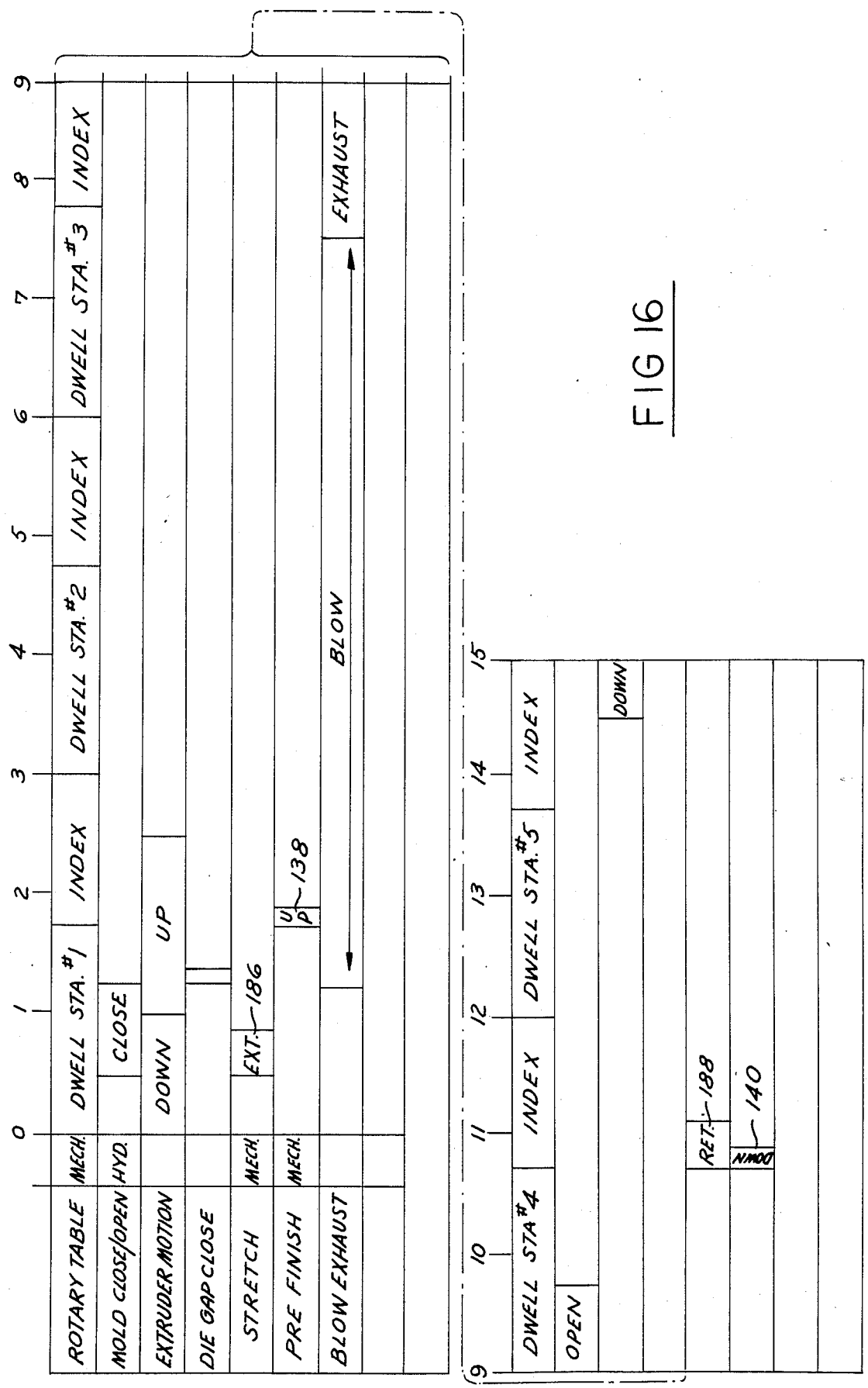
FIG. 16 is a sequence chart for the operation of the machine.

Referring to FIG. 16 the timing sequence chart for the machine of FIG. 1 is illustrated. As a clamp assembly leaves dwell station I and indexes through dwell station II and into dwell station III the bottle is blown. Upon indexing from station III the bottle is exhausted and the clamp assembly 20 opened. Simultaneous with the opening of the clamp assembly 20 in dwell station IV automatic unloading apparatus (not shown) grasps the bottle and unloads the bottle from the machine.

Station V of the machine is provided for preparation of the mold before the mold indexes to dwell station I and the cycle repeats. In this particular machine in-mold labeling may be provided at dwell station V as an example. (The in-mold labeling apparatus is not shown.)

FIG. 2 illustrates schematically the machine at stations II and V taken in the direction of the arrows 2 in FIG. 1. The clamp assemblies 20 rotate about the central pivot 22 here shown in FIG. 2 as a central support 24. The central support 24 supports a guide plate 26 which in turn supports the mold close actuator assembly generally denoted 28 and two rotary hydraulic actuators 30 and 32, shown in FIG. 1.

Figure 4:
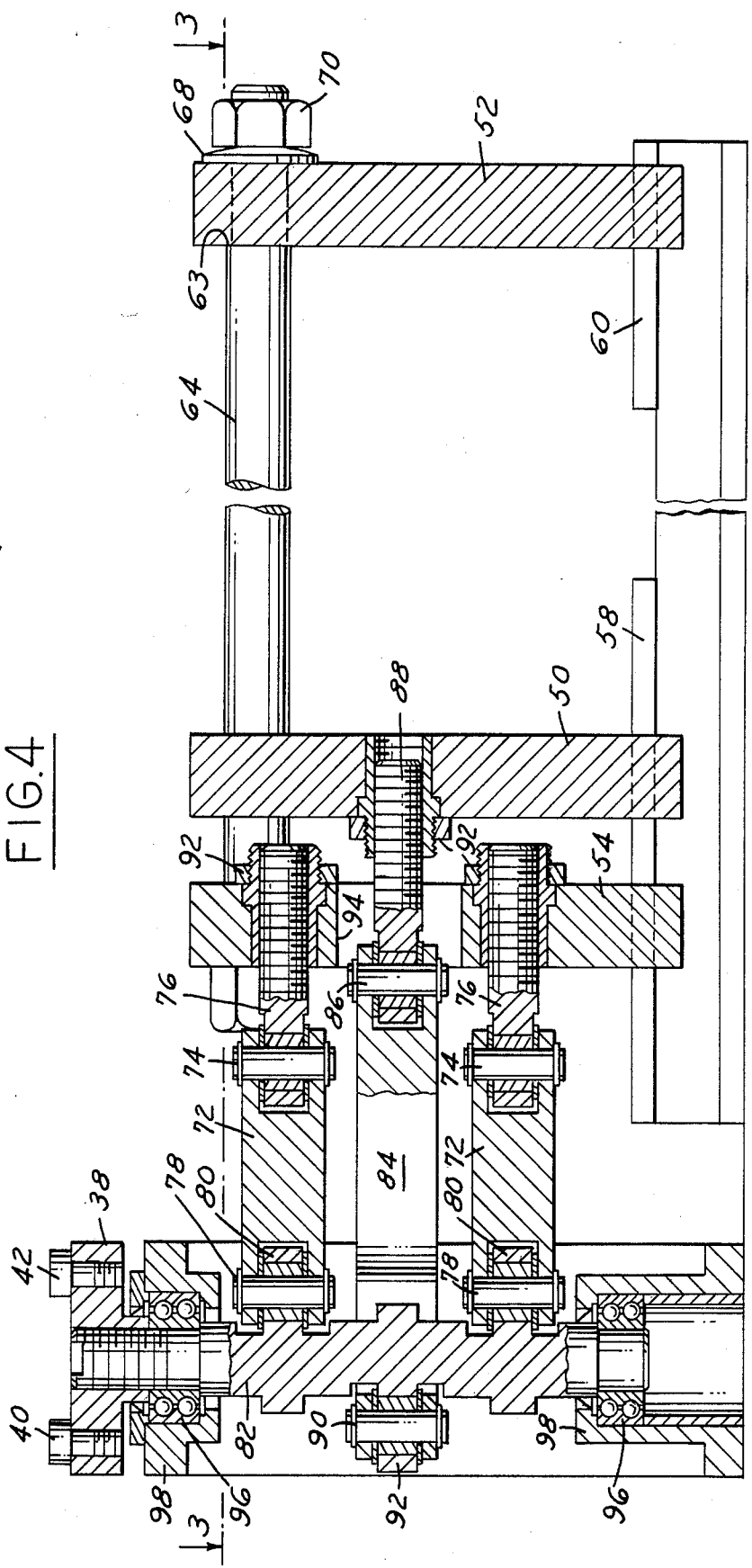
FIG. 4 is a partial cutaway side view of the toggle linkage clamp assembly of FIG. 3.
Figure 5:
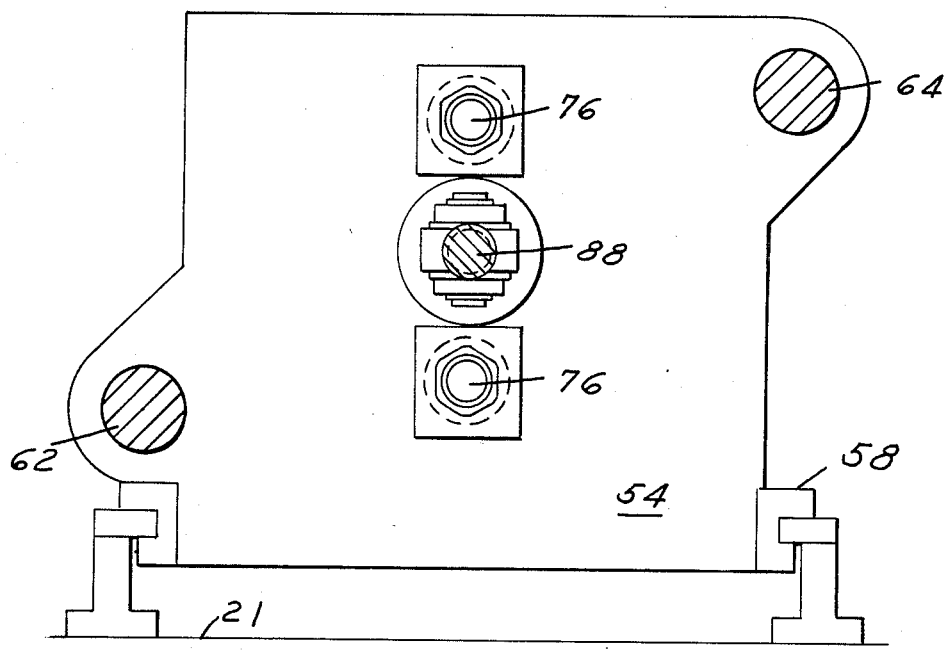
FIG. 5 is an end view of the left platen in the clamp assembly of FIGS. 3 and 4.

FIGS. 3, 4 and 5 illustrate in more detail the construction of a single clamp assembly 20. The clamp assembly comprises two platens 50 and 52 for supporting the two halves of a bottle mold or the like (not shown). A third platen 54 is positioned between the platen 50 and the toggle linkage generally denoted by 36. Two of the platens 50 and 54 are slidable on rails 58 on either side of the clamp assembly and affixed to the rotatable machine table 21. Platen 52 similarily engages rails 60 on either side of the clamp assembly, the rails 60 being affixed to the rotatable machine table 21. A pair of steel rods 62 and 64 are affixed at either end to the platens 52 and 54. The steel rods 62 and 64 pass slidably through bearings 66 inserted in holes in the platen 50, thus the platens 52 and 54 move together with the platen 52 moveable toward and away from the platen 50. The platen 50 moves in opposition to the platen 52. All three of the platens are retained in alignment by the rods 62 and 64 and the rails 58 and 60. As shown, the rods 62 and 64 are shouldered 63 near each end and are tightly fastened to the platen 54 by nuts 70. At the opposite end, Belleville washers 68 are inserted between the platen 52 on each rod and the retaining nut 70 on each rod to urge the platen 52 against the shoulders 63. The Belleville washers 68 provide a slight flexibility in the distance between the platens 52 and 54 or between the platens 52 and 50 when the molds (not shown) close tightly.

The toggle linkage assembly 36 comprises separate toggles for the platen 50 and the platen pair 52 and 54. The platen 50 is actuated by identical upper and lower toggle links 72 each attached pivotably by vertical pins 74 to threaded eye studs 76 in turn attached to the platen 54. At the opposite end of toggle links 72 are vertical pivot pins 78 providing engagement with a pair of cranks 80 on a vertical crankshaft 82. Toggle link 84, located vertically between the pair of toggle links 72, is pivotably attached by a vertical pin 86 to a threaded eye stud 88 in turn attached to platen 50. Toggle link 84 is at the other end pivotably attached by a vertical pin 90 to a crank 92 also on the vertical shaft 82. Viewed from above, clockwise rotation of the vertical crankshaft 82 causes the link 84 to move the platen 50 toward the platen 52 and causes the links 72 to pull the platen pair 54 and 52 in the opposite direction. Full 180 degree rotation of the crank 82 clockwise causes the toggle linkages to center and fully shut the two platens 50 and 52 with the mold therebetween tightly closed. Because it is critical that the toggle slightly overcenter with the molds shut tight to assure that the molds remain tight under blowing conditions, the molds must typically be very accurately manufactured.

The clamp assembly 20 shown in FIGS. 3, 4 and 5 contains two features to assure that the molds clamp tightly together without the extreme accuracy requirement normally needed for proper overcentering of the toggle assembly. Firstly, the Belleville washers 68 permit molds that are slightly off size to be accommodated without damage or excessive wear to the toggle linkages. Secondly, each of the threaded eye studs 76 and 88 is affixed to the respective platens 54 and 50 by threaded slip ring clamp assemblies 92 in turn affixed to the respective platens. It may be noted that the platen 54 includes a hole 94 which permits the link 84 vertical pin 86 and threaded eye stud 88 to move therethrough.

At the top of the crankshaft 82 is a rotatable disk 38 threadably affixed or splined to the crankshaft. The rotatable disk 38 in turn has affixed thereto a pair of followers 40 and 42 which engage the rotary hydraulic actuators 30 and 32 shown in FIG. 1. The vertical crankshaft 82 is supported in bearings 96 in turn located in bearing supports 98 affixed to the main rotatable table 21 of the machine.

Each clamp assembly 20 is connected through its respective toggle linkage to its rotatable disk 38 and the two upstanding followers 40 and 42 located on the disk 38, 180 degrees apart. The rotary hydraulic actuators 30 and 32 through their respective couplings at stations I and IV are engageable with the followers 40 and 42 to rotate the disk 38, 180 degrees. Viewing from above at station I the plate 38 is rotated 180 degrees clockwise by the rotary actuator 32 to close the clamp assembly 20. At station IV the plate 38 is rotated 180 degrees counter-clockwise by the rotary actuator 30 to open the clamp assembly 20.

Figure 8:
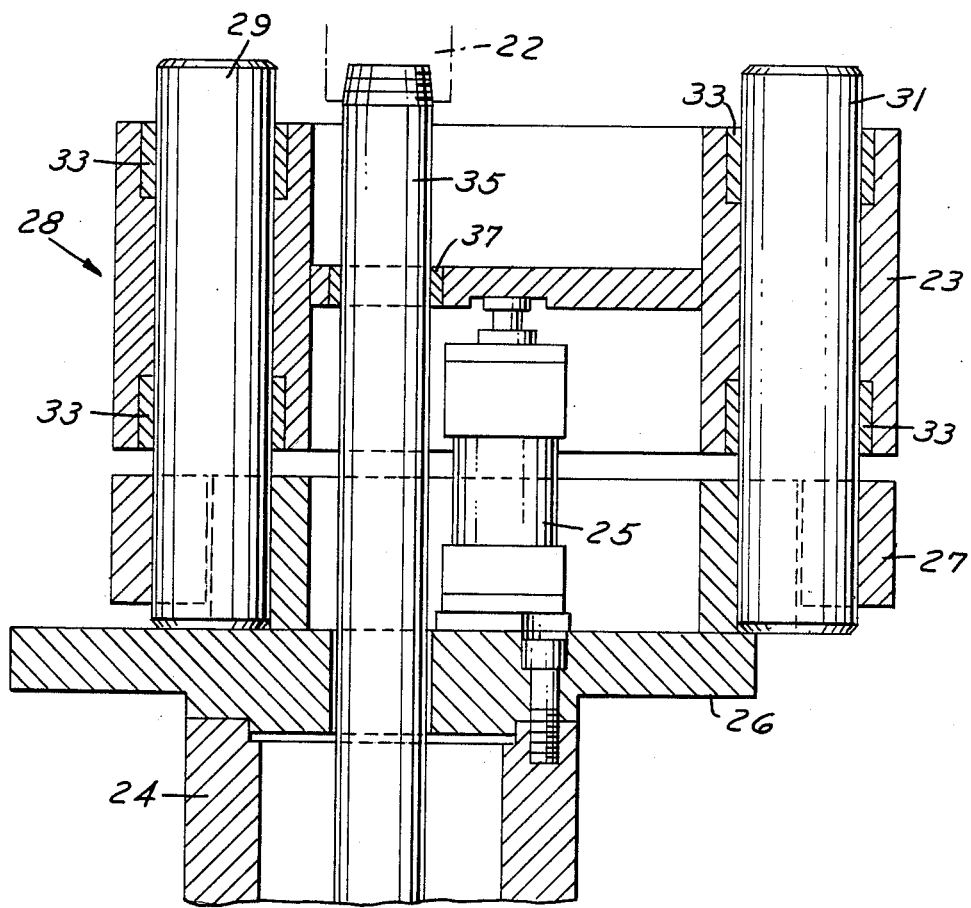
FIG. 8 is a partial vertical section taken along the line 8—8 in FIG. 7.
Figure 6:
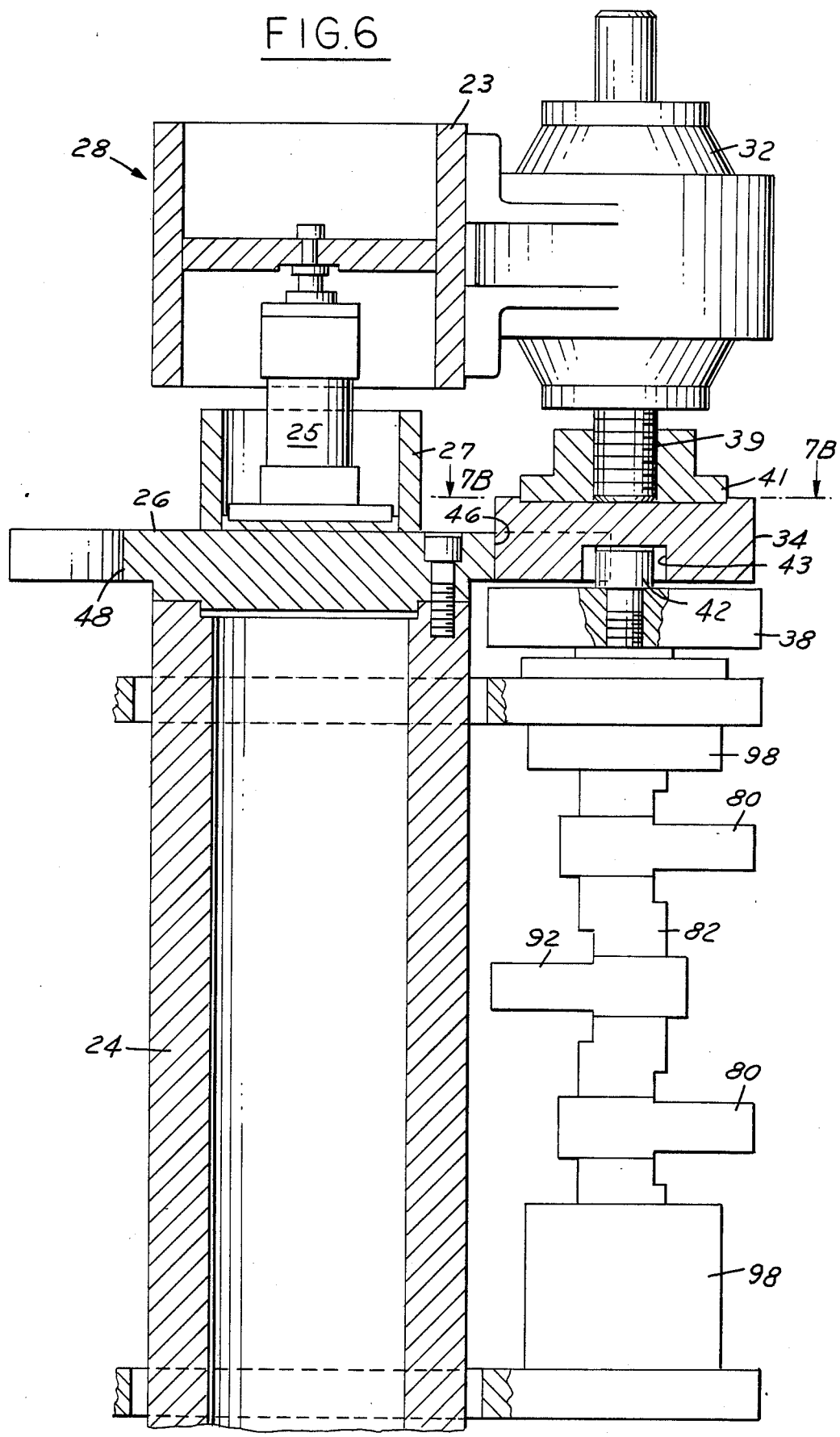
FIG. 6 is a side partial cutaway view of the mold close actuator assembly.
Figure 7:
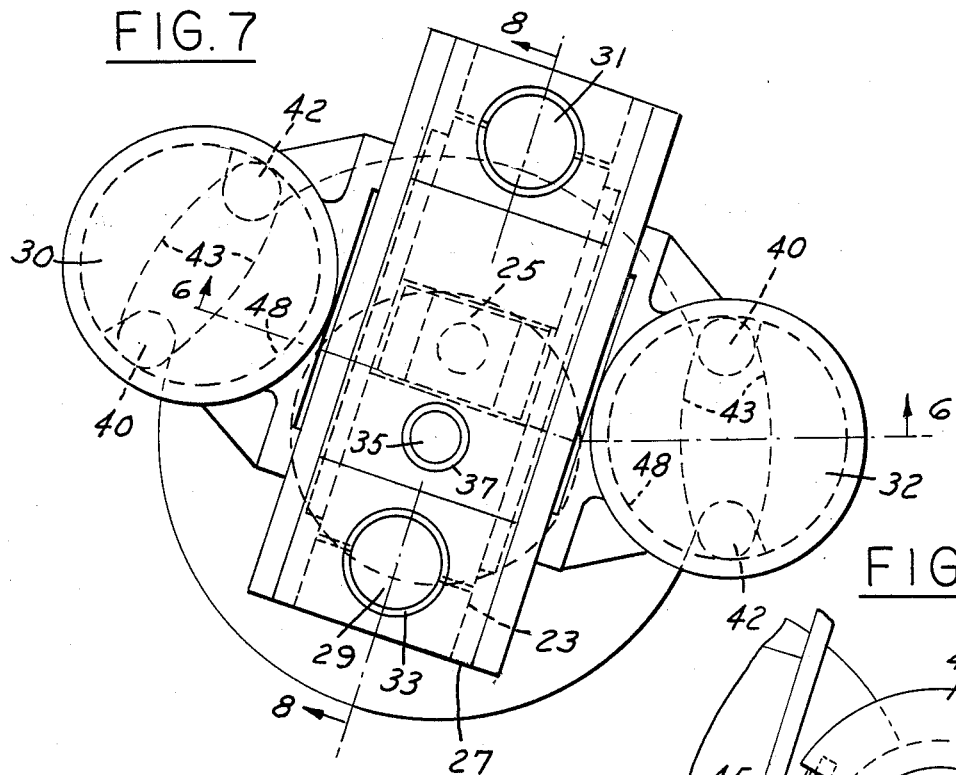
FIG. 7 is a plan view of the mold close actuator assembly.

As shown in FIGS. 6, 7 and 8 the mold close actuator assembly 28 is positioned atop the guide plate 26 in turn fastened to the central support 24. The mold close actuator assembly 28 includes a central vertically moveable actuator support 23 having the pair of rotary hydraulic actuators 30 and 32 affixed to either side. The actuator support 23 is vertically moved by a hydraulic cylinder 25 located therebelow in a guide support 27. The guide support in turn retains two vertical pins 29 and 31 which extend through guide bushings 33 in the actuator support 23. A central alignment shaft 35 also extends through a bushing 37 in the actuator support 23. Thus, actuation of the hydraulic cylinder raises and lowers the rotary actuators 30 and 32.

Each rotary actuator 30 or 32 has a vertical shaft 39 attached to a flange 41 in turn attached to an engagement plate 34. The engagement plate 34 includes a curved sided channel 43 formed in the underside thereof for the engagement of the followers 40 and 42 of each disk 38. With engagement rotary movement of the shaft 39 causes rotation of the crank 82 and opening or closing of the clamp assembly 20.

The combination of the curved side channels 43 in the engagement plates 34 and the vertically moveable actuator assembly 28 provides a redundant means to prevent improper engagement. In normal operation the hydraulic cylinder 25 raises the rotary actuators 30 and 32 and the engagement plates 34 to completely clear the followers 40 and 42 as the clamp assembly 20 rotates into the dwell station. Then, the actuator assembly is lowered and the followers 40 and 42 are engaged by the channel 43. In the event that the actuator assembly 28 fails to raise, the curved sides of the channel 43 permit the followers 40 and 42 to move through the channel 43 without damage and the machine to continue to operate.

Figure 7B:
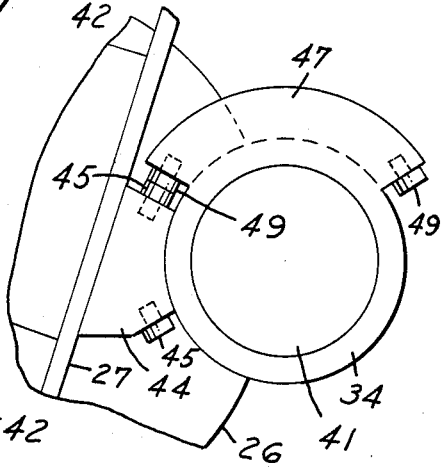
FIG. 7B is a detail of the limit stops for the mold close actuator.
Figure 7A:
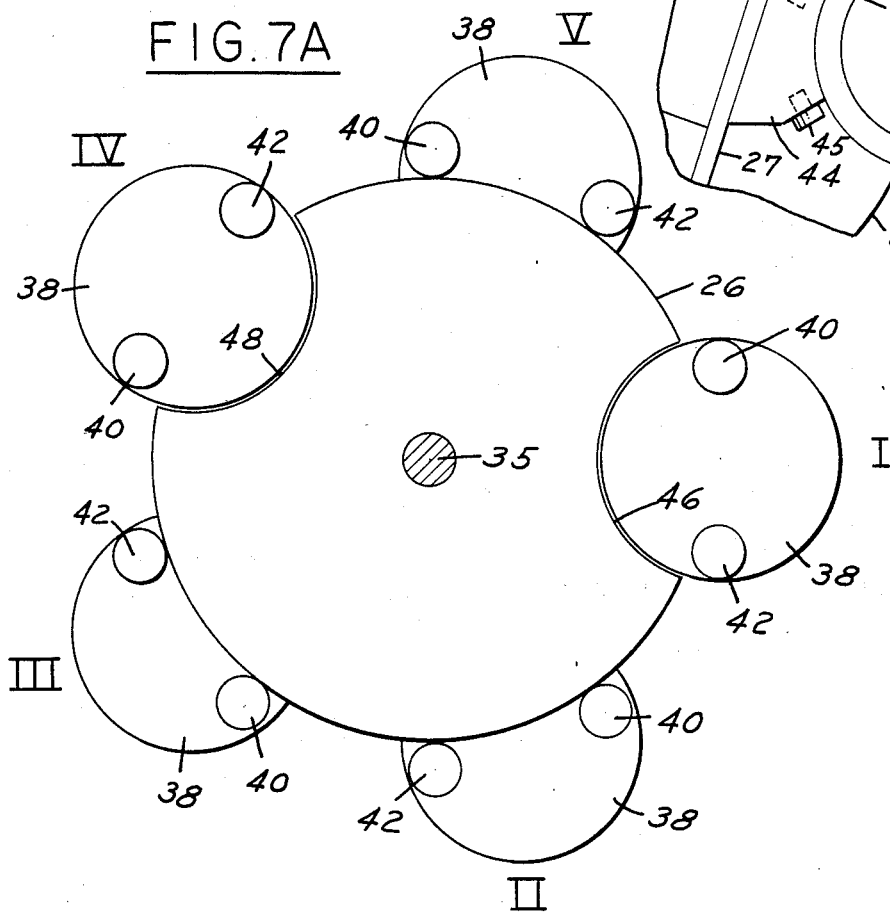
FIG. 7A is a detail of the mold close actuator guide plate.

FIG. 7A details the shape and operation of the guide plate 26. To avoid opening or closing of the clamp assemblies 20 at other stations and during indexing therebetween and to permit closing or opening of the clamp assemblies at stations I and IV respectively, the substantially circular guide plate 26 is axially fixed to the machine. The followers 40 and 42 engage the outside perimeter of the plate 26 as shown except at the two concavities 46 at station I and 48 at station IV. Thus, only at stations I and IV can the clamp assemblies be actuated to either close or open, the clamp assemblies 20 being otherwise additionally latched by the engagement of the followers 40 and 42 with the plate 26. This latching prevents inadvertent actuation of the toggle linkages generally denoted 36 which provide the tight overcenter latching of the clamp assemblies.

FIG. 7B details the actuator stop means for rotary actuator 32. Extending from the guide support 27 is bracket 44 retaining fixed stop pins 45. Extending integrally from the engagement plate 34 is a partial flange 47 retaining stop pins 49. The stop pins 49 move with the plate 34 to limit the rotary motion of the plate 34 to 180° by means of engagement with the fixed stop pins 45.

Figure 10:
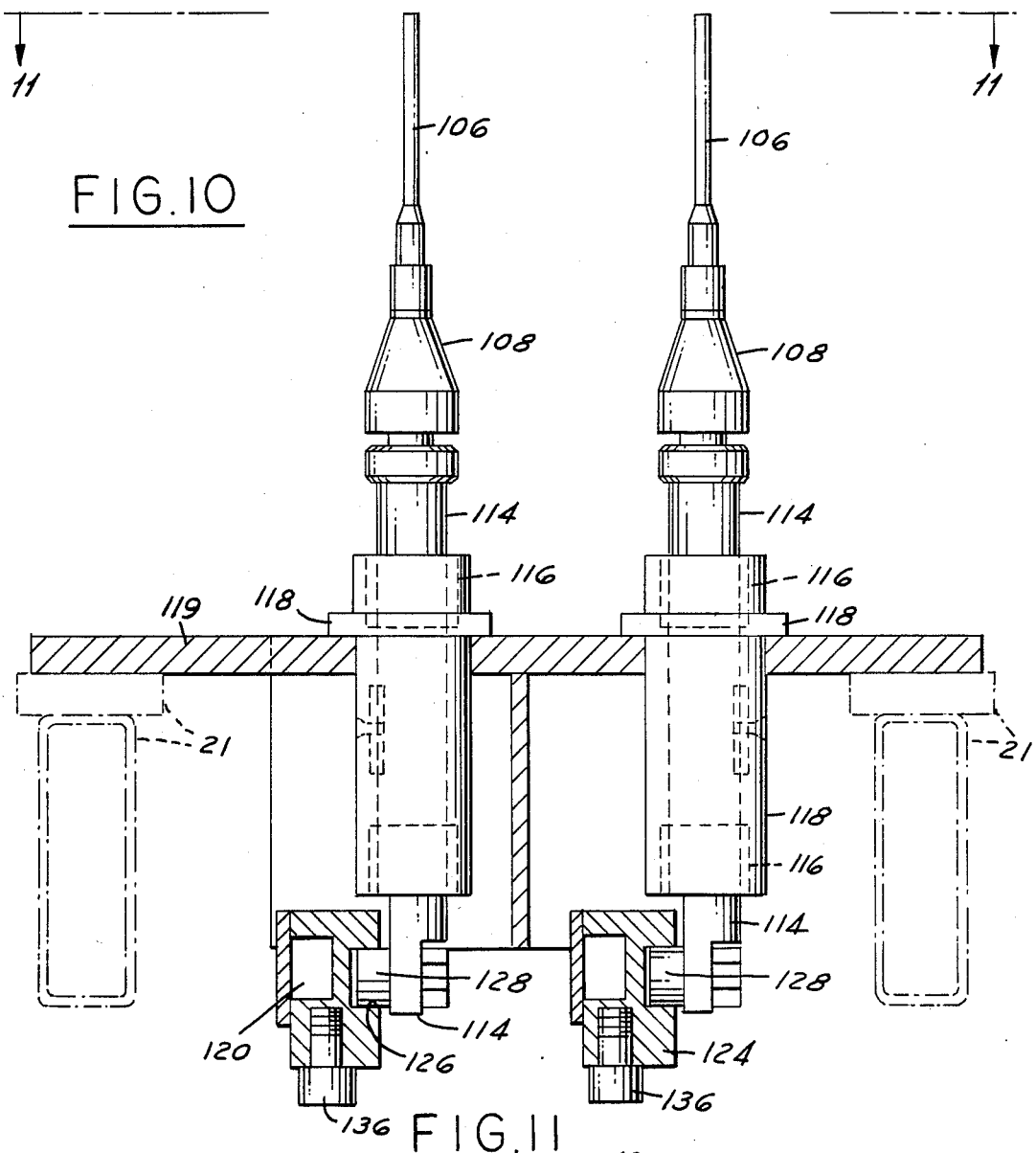
FIG. 10 illustrates the pair of blow pin and pre-finish units taken perpendicular to the view in FIG. 9.
Figure 11:
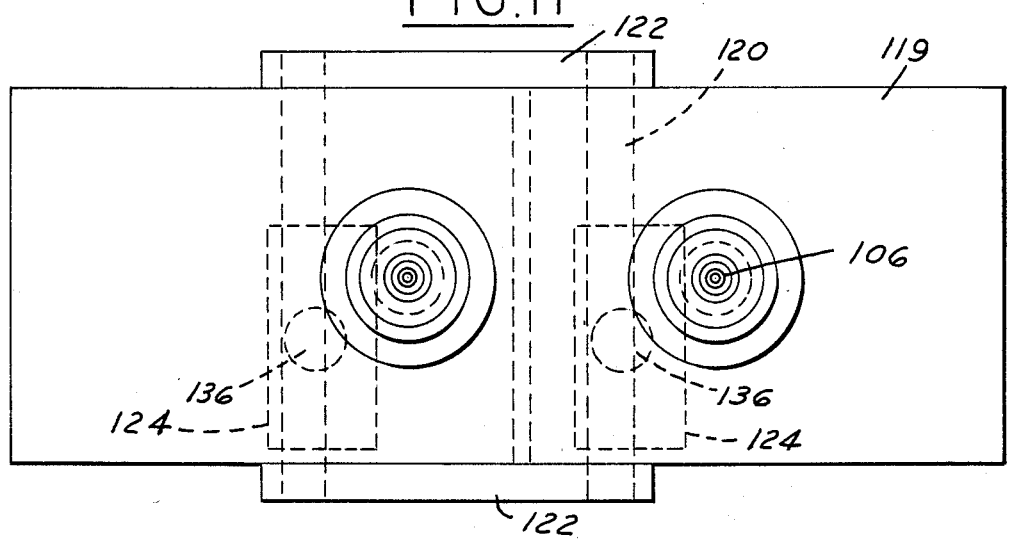
FIG. 11 is a plan view of the two blow pin and pre-finish units of FIG. 10.
Figure 12:
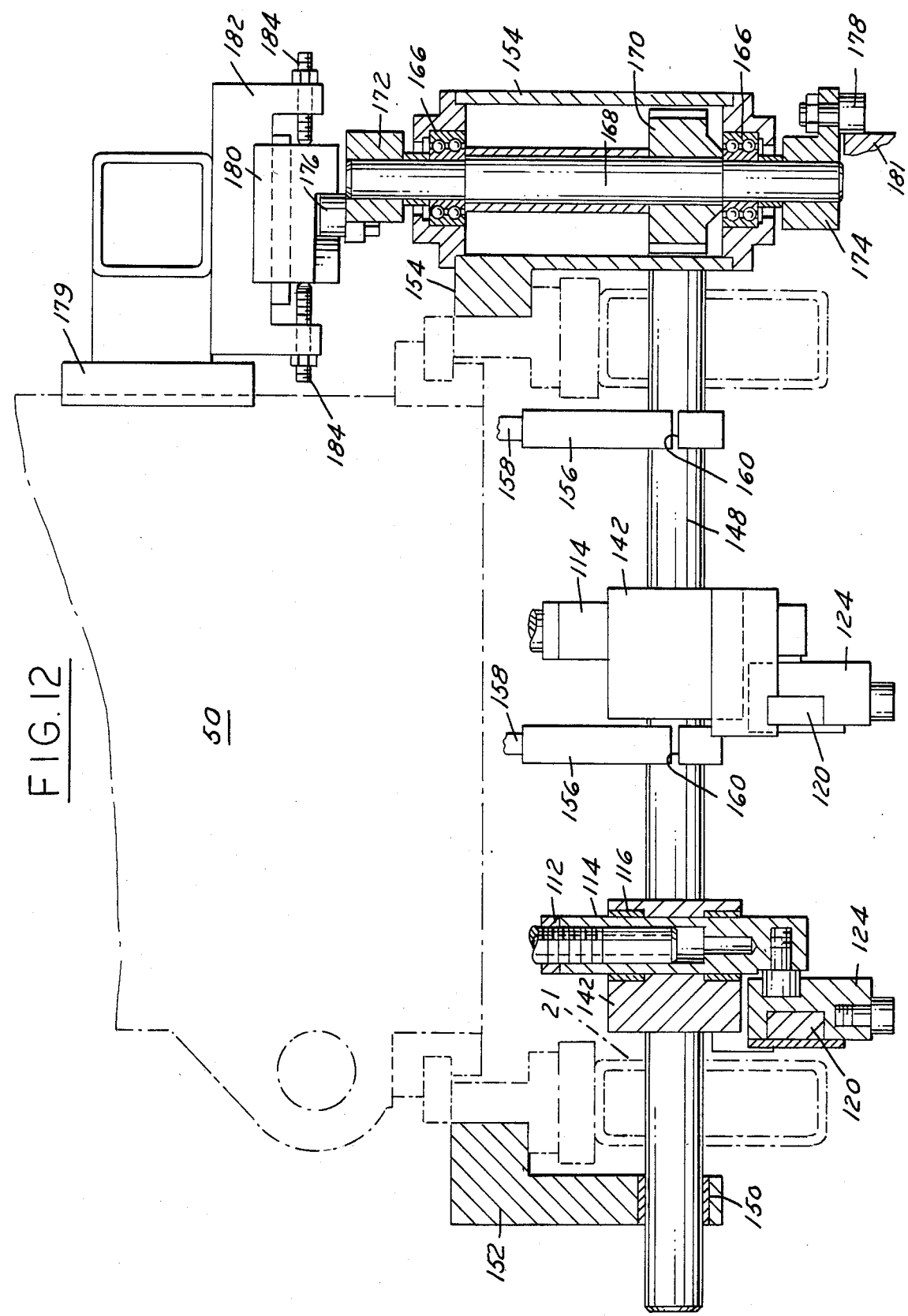
FIG. 12 is a partial cutaway end side view of a dual automatic stretch and prefinish blow pin unit.
Figure 13:
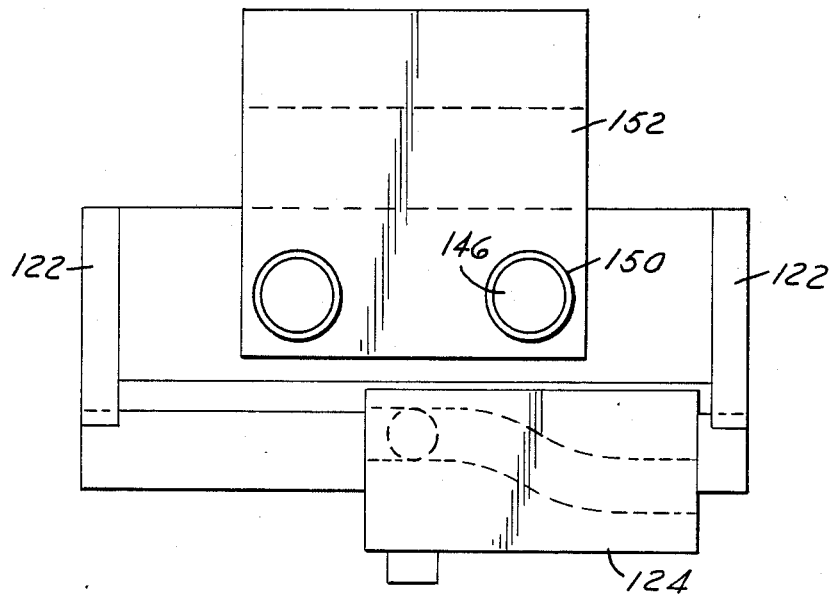
FIG. 13 is a left side view of the dual automatic stretch and pre-finish blow pin unit of FIG. 12.
Figure 15:
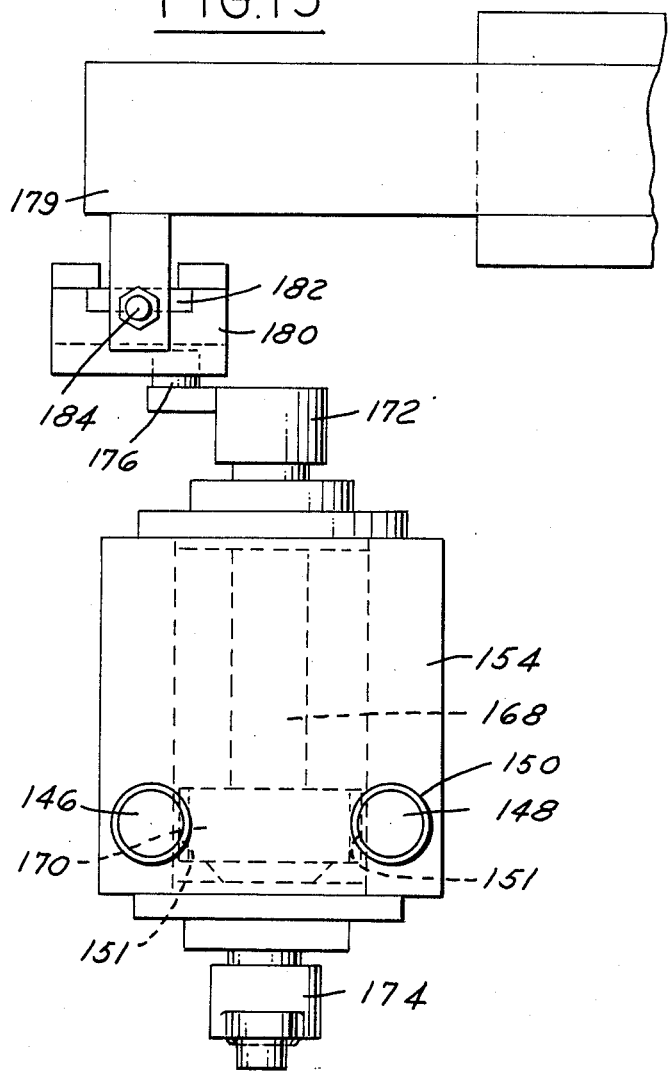
FIG. 15 is a right side view of a portion of the automatic stretch and pre-finish unit taken from the pinion drive end.
Figure 14:
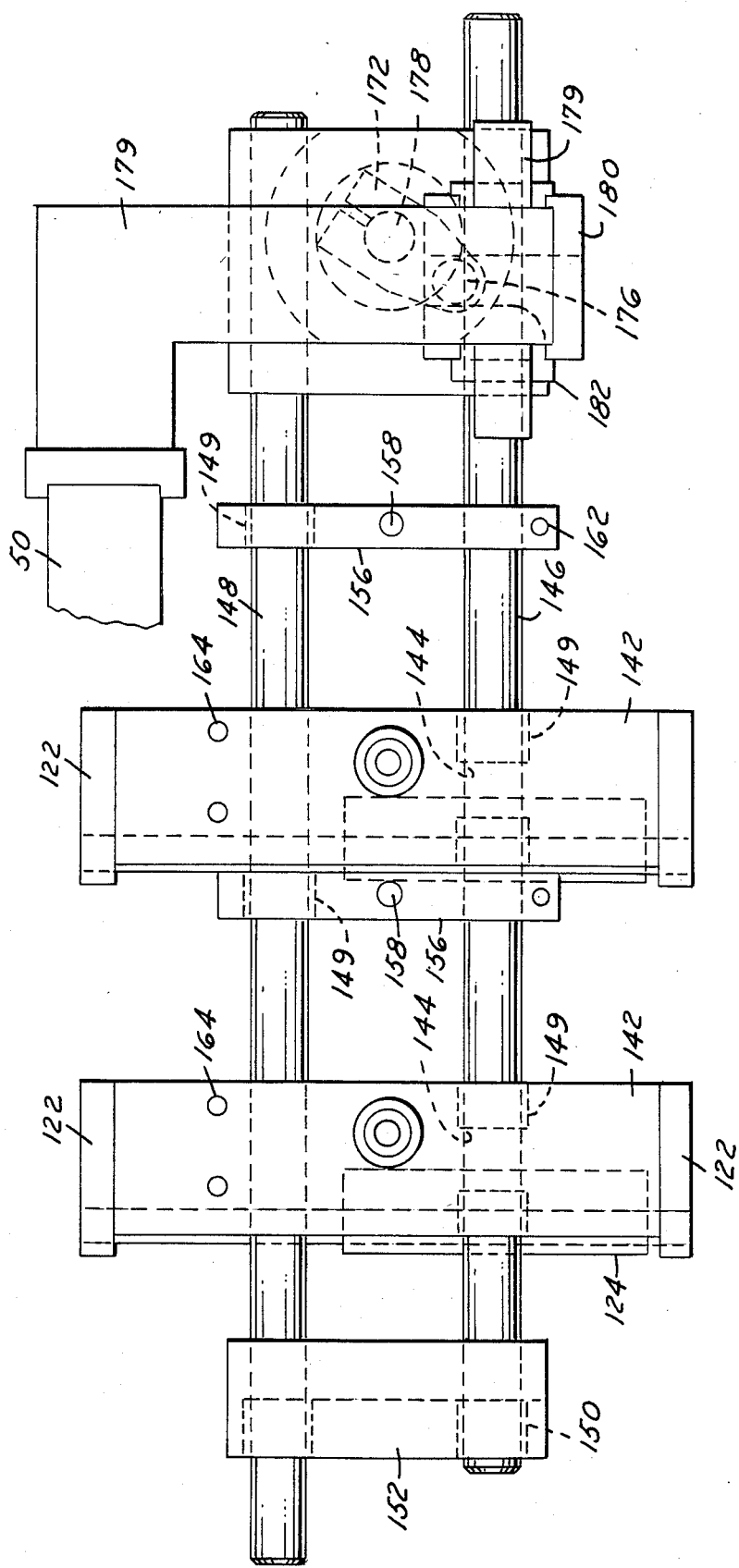
FIG. 14 is a plan view of the dual automatic stretch and pre-finish unit of FIG. 12.

The rotary blow molding machine can be equipped with a variety of blowing and pre-finishing means depending upon the number of cavities in the mold and configuration of the products. Illustrated in FIGS. 9, 10 and 11 are a pair of blow pin pre-finish units for a dual cavity mold. Shown ghosted in FIG. 9 is the pair of platens 50 and 52 and mold halves 100 and 102 clamped tightly shut about a parison within a mold cavity 104. Within the mold cavity is the blow pin 106 comprising a hollow tube supplied with air or nitrogen as desired under pressure for expanding the parison into the mold cavity 104. The blow pin 106 is affixed to and supported on a pre-finish unit 108 inserted up into the lower opening 110 of the mold cavity 104.

The blow pin and pre-finish unit are supported with adjustable threaded means at 112 in a vertically moveable tubular support 114 in turn carried within slidable bearings 116 in a support collar 118. The collar 118 in turn is affixed to a cross plate 119 mounted on the rotatable table 21.

Suspended below each blow pin pre-finish unit is a horizontal track 120 also affixed to the cross plate 119 by vertical supports 122. Moveable horizontally on the track 120 is a cam block 124 having a cam path 126 formed in one side thereof. In engagement with the cam path 126 is a follower 128 in turn attached to the vertical support tube 114. Thus, movement of the cam block 124 back and forth on the track 120 causes the follower 128 and vertical support tube 114 to move vertically thereby causing the pre-finish unit and blow pin to move vertically. The shape of the cam path 126 provides an ascending-descending central section 130 between upper 132 and lower 134 dwell regions.

Figure 17:
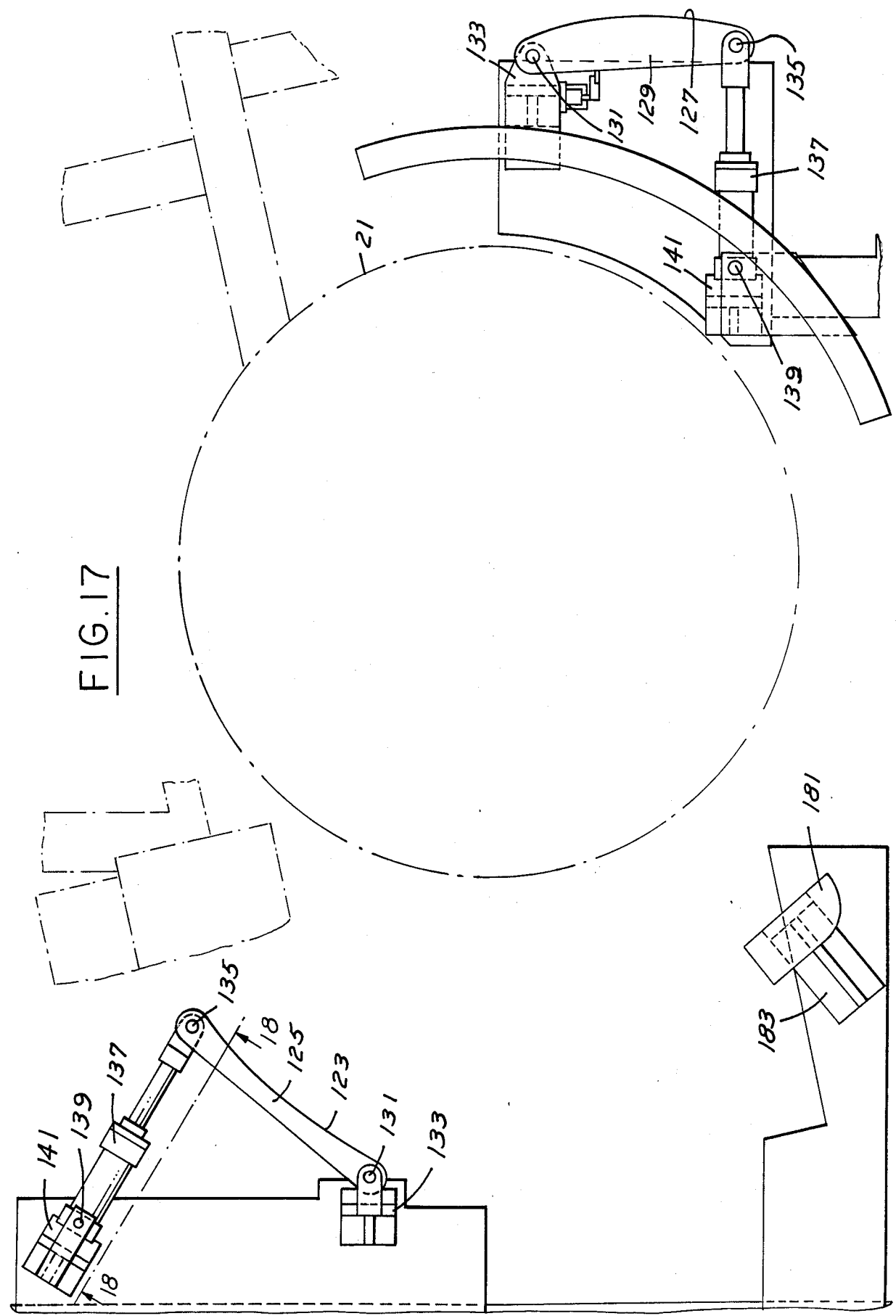
FIG. 17 is a plan view detail of the machine base mounted actuator cams for the automatic stretch and pre-finish blow pin units.

Extending below each cam block 124 is a second follower 136 adapted to be engaged by a second cam path 123 on a cam 125 affixed to the machine bed as shown in FIG. 17. As the rotatable table 21 carrying the clamp assemblies indexes from station I to station II, the followers 136 engage the second cam path 123 thereby causing the cam blocks 124 to shift from the one dwell region 134 to the other dwell region 132 and, in turn, thereby raising the pre-finish units and blow pins 106.

Typically, only two second cam paths 123 and 127 affixed to the machine bed will be located on the machine, one to cause a raising of the pre-finish and blow pin units and the other to cause a lowering of the pre-finish and blow pin units. The second cam path 127 is located on cam 129 between stations IV and V for lowering of the pre-finish and blow pin units at the timing position 140 illustrated in FIG. 16.

As shown in FIGS. 17 and 18 each of the cams 125 and 129 is attached by a vertical pinot 131 to a bracket 133 on the machine base. At the other end 135 of each cam 125 and 129 an air cylinder 137 is pivotally attached, the air cylinder in turn being pivotally attached 139 to a bracket 141 on the machine base.

The cam block and track actuation means for the blow pin and pre-finish units illustrated in FIGS. 9, 10, 11, 17 and 18 provides very short cams with a very short paths for actuating the units. The short cam with the dwell regions 132 and 134 and ascending-descending region 130 provides a simple and very economical mechanism for the prefinish and blow pin unit and eliminates the need for extension camming surfaces on the machine to control the movement of the pre-finish units.

As an alternative to the dual blow pin and pre-finish units shown in FIGS. 9, 10 and 11, FIGS. 12, 13, 14 and 15 illustrate a dual blow pin and pre-finish unit in combination with stretching means wherein the lower end of the extruding parison is stretched to an oblong shape as the mold halves close about the parison. The mechanism is supported on the rotary table 21 and moves with the clamp assemblies and platens 50 and 52 which hold the mold halves. In this particular embodiment, the pre-finish units 108 and blow pins 106 are again threadably mounted 112 on a tubular support 114 for vertical movement and cam actuation with moveable cam blocks 124 as disclosed above. The tubular supports are slidably mounted in bearings 116 in turn supported by cross blocks 142 each having a pair of horizontal holes 144 therethrough.

Passing through the holes 144 and supporting the blocks 142 are a pair of rods 146 and 148. The rods 146 and 148 are supported at one end in slidable bearings 150 in turn supported on the machine table 21 and rail by a bracket 152. At the other end of the rods 146 and 148, a second bracket 154, also supported on the rotatable table 21 and other rail, slidably supports the rods for independent axial movement. A pair of second blocks 156, by means of parallel holes 144, are also supported on the pair of rods 146 and 148.

Blocks 156 have stretch pins 158 extending upwardly therefrom. Blocks 156 are split at 160 and include screw means at 162 for tightly affixing blocks 156 to rod 146. Blocks 156, however, are slidably supported 149 on the rod 148. In turn, blocks 142 are split adjacent rod 148 and affixed thereto by screws at 164. Blocks 142 are slidably supported 149 on rod 146, thus blocks 142 move with rod 148 and blocks 156 move with rod 146.

Located within bracket 154 on a pair of bearings 166 is a vertical shaft 168. The vertical shaft 168 supports a pinion gear 170 between and engaging racks 151 on each rod 146 and 148, thus, rotation of the shaft 168 and pinion 170 causes axial movement in opposite directions of the rods 146 and 148. Opposed axial motion of the rods 146 and 148 causes the blocks 142 and 156 to move in opposite directions. Movement of blocks 142 and 156 apart provides the stretching movement. As shown, the stretching means is fully extended. The opposite movement of blocks 142 and 156 retracts the stretching means.

At the upper and lower ends of the shaft 168 are attached cranks 172 and 174. Each crank 172 and 174 is equipped with upper and lower followers 176 and 178 respectively. Affixed to platen 50 is a bracket assembly and support 179 for an extension cam 180. Upon closing movement of the platen 50 at station I the extension cam 180 engages the follower 176 causing the crank 172 and shaft 168 to be rotated, in turn causing the stretching means to extend.

The amount of extension is adjustable by the horizontal position of the cam 180 that is selected. The cam 180 is slidably moveable on a supporting track 182 affixed to the bracket assembly and support 179. Adjustment screws 184 provide the horizontal adjustment of the cam 180.

In a similar manner the lower follower 178 engages a retraction cam 181 which causes retraction of the stretching means. The retraction cam, however, is affixed to the machine base by a bracket 183 as shown in FIG. 17 for engagement with follower 178 during indexing movement from stations IV to station V. The locations for extension and retraction of the stretching means are given on the sequence chart FIG. 16 at 186 and 188.

Leftward adjustment of the cam 180 by the screws 184 reduces the total stretching stroke whereas rightward adjustment of the cam 180 increases the stretching stroke. As before, the actual extension and retraction cams installed on the machine to actuate the stretching mechanism are very short relative to the entire movement of the mechanism about the machine and only two in number, one to cause extension of the stretching means and one to cause retraction of the stretching means.

In FIG. 16 the sequence chart for the rotary blow molding machine illustrates the various operations that occur at each of the dwell stations I through V and the indexing motion therebetween. the "Extruder Motion" refers to the single or double vertical parison extruders located above dwell station I. A suitable vertical extruder is disclosed in the applicant's co-pending U.S. application Ser. No. 592,518. The "Die Gap Close"

refers to the full closure of the extrusion die by the mandrel therein thereby severing the parison from the extruder.

The "Stretch" refers to the stretch means disclosed above when included in the machine. Typically, a parison is stretched into an oblong cross-section just prior to mold closure where the final product includes a handle or is substantially oblong in cross-section.

The sequence chart is illustrative only. The actual timing of each operation at a dwell station is partially dependent on the particular plastic material extruded and the mold configuration. Station V is included for in-mold-labelling or other operation to prepare the mold for the next parison at station I.

I claim:

1. In a multiple station, multiple clamp assembly blow molding machine, the improvement comprising dual opposed moveable mold platens in each clamp assembly, at least one toggle linkage in each clamp assembly actuatably attached to each platen, rotatable crank means in each clamp assembly in engagement with each toggle linkage for actuation thereof, engagement means on said crank means for rotatable actuation thereof and a rotatable actuator at at least one station of said machine, said rotatable actuator engageable with said engagement means for the rotation of said crank means and movement of said platens by said toggle linkages.

2. The blow molding machine of claim 1 including at least two rotatable actuators, one being located at a molding closing station and the second being located at a mold opening station.

3. The blow molding machine of claim 2 wherein the clamp assemblies are rotatably grouped about a central vertical axis and supported on a rotary table assembly, said rotary table assembly including stationary means engageable with said crank means to prevent rotation of said crank means except at said mold opening and mold closing stations.

4. The blow molding machine of claim 1 wherein said clamp assemblies include means to adjust the length of at least one of said toggle linkages.

5. The blow molding machine of claim 1 wherein said clamp assemblies include spring means actuatable upon toggle overlocking of the closed mold platens.

6. The blow molding machine of claim 3 wherein said rotary actuators include means to vertically engage and disengage said crank means engagement means.

7. The blow molding machine of claim 1 wherein said rotary actuator includes means to permit said engagement means to horizontally engage and disengage the rotary actuator.

8. In a multiple station, multiple clamp assembly rotary blow molding machine, the improvement comprising a plurality of clamp assemblies rotatably indexable from station to station about a center pivot, rotary actuator means at a mold closing station engageable with crank means in a clamp assembly to actuate a toggle means in a clamp assembly to close the clamp assembly at the mold closing station and rotary actuator means at a mold opening station engageable with said crank means to open the clamp assembly at the mold opening station, and means on said machine to retain said clamp assemblies in the closed or open condition during indexing movement and in at least one other station, said means to retain the clamp assemblies in the open or closed position being separate from the rotary actuator means at the mold closing station and the mold opening station to close or open the clamp assemblies.

9. The rotary blow molding machine of claim 8 including cams located on the base of the machine and cam followers mounted on the clamp assemblies, said followers adapted to engage the cams at specified locations on the machine as the clamp assemblies are indexed about the machine.

10. The rotary blow molding machine of claim 9 including pre-finish means on the clamp assembly and wherein at least one of the cam followers on a clamp assembly is adapted to actuate the pre-finish means.

11. The rotary blow molding machine of claim 9 including stretch means on the clamp assembly and wherein at least one of the cam followers on a clamp assembly is adapted to retract the stretch means.

12. In a multiple station, multiple clamp assembly rotary blow molding machine, the improvement comprising a plurality of clamp assemblies rotatably indexable from station to station about a center pivot, first rotary means at a mold closing station to actuate toggle means in a clamp assembly to close the clamp assembly at the mold closing station and second rotary means at a mold opening station to actuate said toggle means to open the clamp assembly at the mold opening station, and means on said machine to retain said clamp assemblies in the closed or open condition during indexing movement and in at least one other station, said means to retain the clamp assemblies in the open or closed position being separate from the means at the mold closing station and the mold opening station to close or open the clamp assemblies wherein each of the clamp assemblies comprise dual opposed moveable mold platens and include at least one toggle linkage actuatably attached to each platen, rotatable crank means in engagement with each toggle linkage for actuation thereof, and means on said crank means to engage the first rotary mold closing means and second rotary mold opening means at the respective mold closing and mold opening stations.

13. The rotary blow molding machine of claim 12 wherein the means to retain the clamp assemblies in the closed or open position comprises a substantially circular plate affixed to the center of the machine, said plate relieved for disengagement at the mold closing and mold opening stations, and said plate engageable between the mold closing and mold opening stations with means on the crank means of each of the clamp assemblies.

14. The rotary blow molding machine of claim 13 wherein the means on the crank means to engage the rotary mold closing means and rotary mold opening means also are the means to engage the circular plate between the mold closing and mold opening stations.

15. The rotary blow molding machine of claim 8 wherein the means to retain the clamp assemblies in the closed or open position comprises a substantially circular plate affixed to the machine and axially aligned with the center pivot, said plate relieved for disengagement of the mold closing and mold opening stations.

* * * * *

UNITED STATES PATENT AND TRADEMARK OFFICE
CERTIFICATE OF CORRECTION

PATENT NO. : 4,673,347

DATED : June 16, 1987

INVENTOR(S) : William E. Ziegler

It is certified that error appears in the above-identified patent and that said Letters Patent are hereby corrected as shown below:

Column 7, line 46: Delete "extension" and substitute --extensive--.

Column 9, line 30: Delete "molding" and substitute --mold--.

Column 10, line 63: Delete "of" and substitute -- at --.

Signed and Sealed this

Third Day of November, 1987

Attest:

DONALD J. QUIGG

Attesting Officer

Commissioner of Patents and Trademarks